United States Patent [19]

Holberg

[11] Patent Number: 4,492,927
[45] Date of Patent: Jan. 8, 1985

[54] OFFSET VOLTAGE COMPENSATION CIRCUIT

[75] Inventor: Douglas R. Holberg, Austin, Tex.

[73] Assignee: Mostek Corporation, Carrollton, Tex.

[21] Appl. No.: 430,446

[22] Filed: Sep. 30, 1982

Related U.S. Application Data

[62] Division of Ser. No. 265,983, Jun. 30, 1980, Pat. No. 4,390,754.

[51] Int. Cl.³ ............................................. H03F 1/01
[52] U.S. Cl. ........................................ 330/9; 330/51; 328/127; 328/162; 328/165
[58] Field of Search ............................. 330/9, 51, 110; 328/127, 162, 165; 307/491

[56] References Cited
FOREIGN PATENT DOCUMENTS
2337433 6/1974 Fed. Rep. of Germany .......... 330/9

Primary Examiner—James B. Mullins

[57] ABSTRACT

A dual-tone multi-frequency (DTMF) tone generator circuit (10) produces selected frequency row and column tones which are combined to generate a DTMF signal. Key board scan circuits (42, 44) scan a conventional push-button telephone key board to produce row and column input signals. Row and column fundamental rate signals are generated by fundamental counters (48,76) from a reference signal derived from an external crystal (12). Row and column integration rate signals are generated by integrator counters (50,78) also derived from the reference signal. Specialized row and column clock control signals (SLOPE RATE, SLOPE SIGN, AUTO ZERO) are produced by clock generators (58,82). Row and column integrators (64,92) integrate reference signals to produce discrete voltage steps at the rate of the row and column integration rate signals to produce row and column signals made up of a plurality of segments for each cycle of the signal. Each signal segment comprises a plurality of similar voltage steps having amplitude and polarity determined by the specialized row and column clock signals (SLOPE RATE, SLOPE SIGN). The row and column signals are combined in a summer (68) to produce the DTMF signal.

4 Claims, 15 Drawing Figures

OFFSET VOLTAGE COMPENSATION CIRCUIT

This is a division of application Ser. No. 265,983, filed June 30, 1980, now U.S. Pat. No. 4,390,754.

TECHNICAL FIELD

The present invention pertains generally to tone generator circuits and more particularly to a circuit for synthesizing a sinusoidal signal by the use of multiple amplitude and polarity integration steps.

BACKGROUND ART

In recent years push-button telephones have come into widespread use. Such telephones operate by generating a selected pair of tones for each key. Thus a tone generator must be provided within the telephone for generating each of the fundamental tones. Heretofore the most widely used approach in generating the tones has been to use LC circuits together with discrete transistors. But this is an expensive approach for generating the eight tones required in a push-button telephone.

It has been proposed to utilize integrated circuits for generating the dial tones and such circuits have been marketed. The standards for tone generators are laid out for the Bell system in Bell Publication 47001 entitled "Electrical Characteristics of Bell System's Network Facilities at the Interface with Voiceband, Ancillary and Data Equipment." The Rural Electrification Administration (REA) standards are given in publication 345-74 and the Electronic Industry Association (EIA) standards are in the EIA publication SP 1286. In addition to meeting these specifications, customer requirements frequently require that tone circuits work at voltages as low as 2 volts. This requirement is a problem due to the threshold voltages of MOS (metal oxide semiconductor) transistors.

A further problem is presented by telephone specifications, especially European, in regard to total harmonic distortion. The techniques for generating tones using MOS technology have heretofore utilized a relatively small number of step voltages for each cycle of the sine wave. When a tone signal is generated in this manner there is substantial harmonic distortion at relatively low frequencies and this distortion frequently exceeds European specification limits. Further, it is substantially more difficult to farbricate on-chip filters for low frequencies rather than high frequencies.

Therefore, there exists a need for a design of a circuit for fabrication in MOS technology which can produce the tone signals required in a DTMF (dual-tone-multi-frequency) telephone system in which the integrated circuit can successfully work at a voltage as low as 2.0 volts and at the same time generate no more distortion within the frequency limits allowed under the various telephone system standards and customer requirements.

DISCLOSURE OF THE INVENTION

The present invention comprises a circuit for fabrication in MOS technology for the generation of tone signals in a DTMF system. A key board scan circuit is provided for the row and columns of a telephone key board to monitor which of the rows and columns have been activated. A fundamental oscillator for each of the row and column key board scan circuits is provided to generate the fundamental frequencies of the selected row and column keys at a countdown from a reference frequency. For each of the fundamental frequencies there is generated in integration frequency rate signal which is also derived from the reference frequency. The integration rate frequency signals are at substantially higher frequencies than the fundamental frequency signals to lower the amplitude of sampling distortion and place the distortion components at high frequencies. The selected tone signal is generated by integrating in steps at the rate of the integration frequency signal. The polarity and amplitude of the steps is changed under the command of a set of specialized clock signals to produce an approximation to a sinusoidal signal at the rate of the fundamental frequency corresponding to either the row or column key which was activated. The integration frequency is at a much higher rate than the fundamental frequency such that the synthesized tone signal is generated essentially with ramps rather than steps. As the result, the tone signal produced with the circuit of the present invention has relatively low harmonic distortion, especially at low frequencies. The row and column signals thus produced are summed to generate the DTMF signal corresponding to a selected key.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

In the following description like reference numerals are used throughout the various views to represent like elements.

Figure 1:
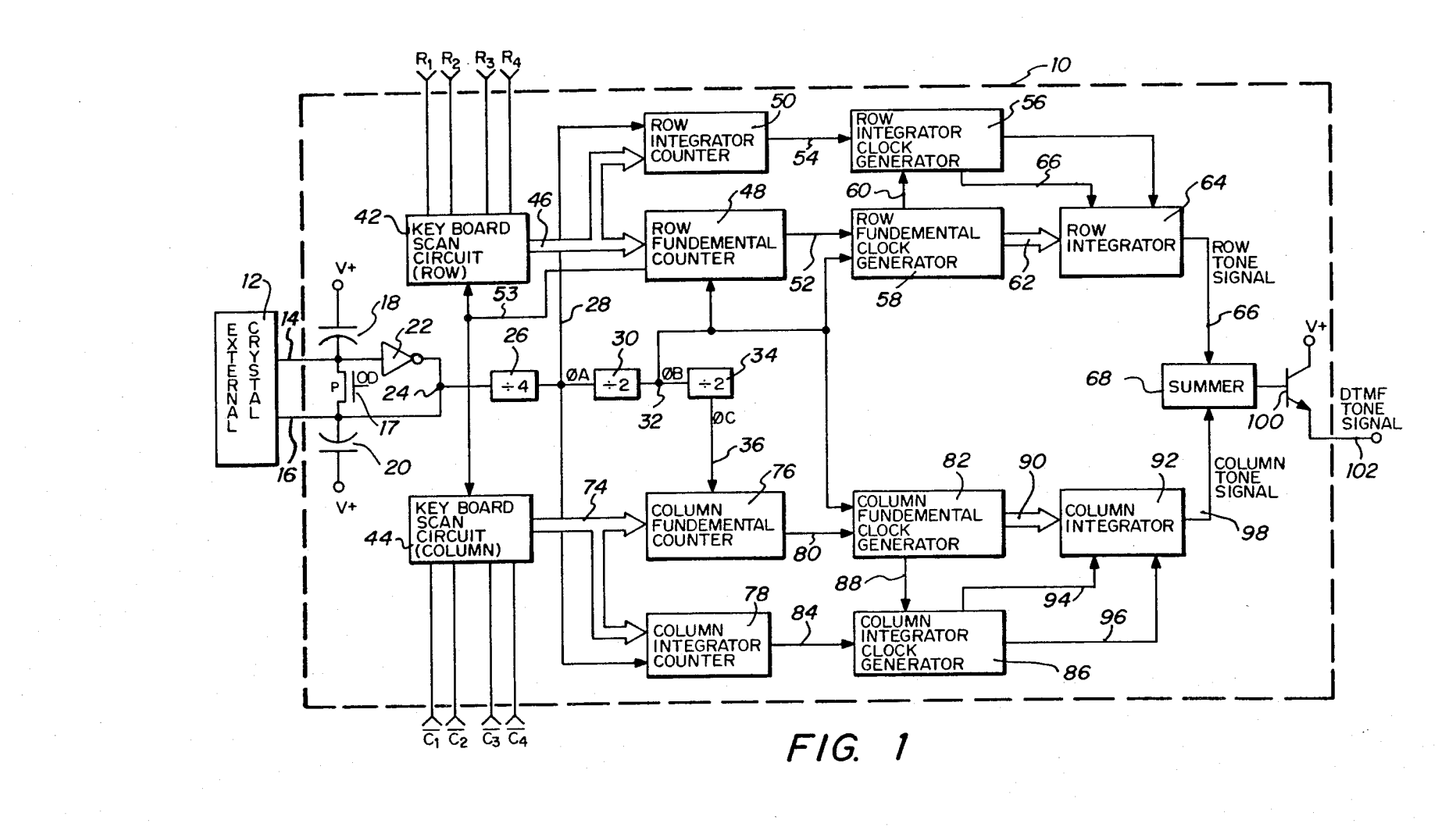
FIG. 1 is a block diagram of the dual-tone-multi-frequency tone generation circuit of the present invention.

A block diagram of a dual-tone-multi-frequency (DTMF) signal generator of the present invention is illustrated in FIG. 1. An external crystal 12 is connected to circuit 10 through terminals 14 and 16 to circuit 10. A transistor 17 has the drain and source terminals thereof connected between terminals 14 and 16 and the gate terminal connected to receive a signal OD. Transistor 17 functions as a load resistor. Capacitors 18 and 20 are respectively connected between terminals 14 and 16 and the power supply V+. Teminal 14 is connected to the input ofa node 24. A reference frequency signal is transmitted from node 24 to a divide-by-four circuit 26 which produces a clock signal $\phi A$ at terminal 28. The $\phi A$ signal is transmitted to the input of a divide-by-two circuit 30 which produces a clock signal $\phi B$ at terminal 32. The $\phi B$ signal is transmitted to a divide-by-two circuit 34 which produces a clock signal $\phi C$ at terminal 36.

A telephone style key pad (not shown) provides connections between a set of row terminals $R_1$, $R_2$, $R_3$ and $R_4$ and a set of column terminals $C_1$, $C_2$, $C_3$ and $C_4$. Upon depressing an individual key in the key pad one of the row terminals is connected to one of the column terminals.

The row terminals $R_1$-$R_4$ are connected to a keyboard scan circuit 42 which operates in conjunction with a keyboard scan circuit 44 which is connected to the colmn terminals $C_1$-$C_4$.

The keyboard scan circuit 42 produces a unique combination of signals which identifies the particular row terminal which has been selected by operation of the keyboard. The signals decoded from the keyboard operation are transmitted as input signals through a data path 46 to a row fundamental counter 48 and to a row integrator counter 50.

In response to the signals received from the keyboard scan circuit 42 and to the clock signal $\phi B$, the row fundamental counter 48 produces a pulse signal which is at the frequency corresponding to the selected row terminal. The fundamental frequency signal is transmitted through line 52. A key board scan signal is transmitted from counter 48 through a line 53 to the key board scan circuits 42 and 44.

The row integrator counter 50 produces an integration frequency rate signal in response to the combination of signals received through path 46 from the keyboard scan circuit 42 and the clock signal $\phi A$. The integration frequency signal is transmitted through a line 54 to a row integrator clock generator circuit 56.

The fundamental frequency pulse signal on line 52 is transmitted to a row fundamental clock generator 58 which produces a plurality of specialized clock signals. Various ones of the specialized clock signals are transmitted to the row integrator clock generator 56 through a data path 60 and through a data path 62 to a row integrator 64. The row integrator clock generator 56 provides clock signals through lines 66 and 68 to the row integrator 64.

The row integrator 64 utilizes the various signals which it receives to produce a tone signal which has approximately a sinusoidal shape and is at a frequency corresponding to the selected row terminal. The tone signal is generated at a node 66 and is transmitted to a summer 68. The column portion of the circuit 10 functions in exactly the same manner as the row portion described above to generate a tone signal corresponding to the selected column terminal. Briefly the keyboard scan circuit 44 decodes the selected column terminals to send a combination of input signals through a data path 74 to a column fundamental counter 76 and to a column integrator counter 78. The column fundamental counter 76 produces a fundamental frequency pulse signal on a line 80 which is in turn connected to a colum fundamental clock generator 82. The column integrator counter 78 produces an integrator frequency rate signal that is transmitted through line 84 to a column integrator clock generator 86. The column fundamental clock generator 82 produces a plurality of specialized clock signals which are provided to the column integrator clock generator 86 through a line 88 and through a data path 90 to a column integrator 92. The column integrator clock generator 86 produces a group of clock signals which are transmitted through lines 94 and 96 to the column integrator 92. The column integrator 92 produces a tone signal corresponding to the selected column terminal and transmits the tone signal thus produced through a line 98 to the summer 68.

The keyboard scan circuits 42 and 44 decode the selected key and generate input signals for other elements of circuit 10. These input signals contain row and column components and determine the frequencies for the row and column signals to be produced for a given DTMF signal.

Both the row tone signal and the column tone signals are provided to the summer 68 to produce a DTMF tone signal which is transmitted through a NPN transistor 100 to an output terminal 102.

Figure 2:
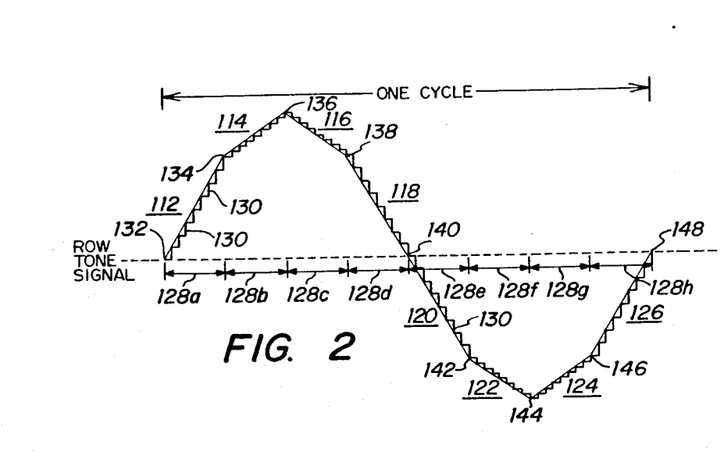
FIG. 2 is a waveform illustrating the tone signal generated by the circuit illustrated in FIG. 1.

The row terminal signal produced by the row integrator 12 in FIG. 1 is illustrated in FIG. 2. Each cycle of the tone signal is produced as a plurality of incremental integration steps. Each cycle of the tone signal comprises eight separate segments 112-126. Each of the segments has the same time period as indicated by the reference numerals 128a-128h. The integration is carried out in a plurality of steps 130 in which the integration steps occur at the rate of the integration frequency rate signal produced by the row integrator counter 50. The total of the time periods 128a-128h corresponds to the period of the fundamental frequency signal produced by the row fundamental counter 48.

Segment 112 of the tone signal is integrated from point 132 at the zero axis to point 134 in a series of integration increments each having a first amplitude. The segment 114 is integrated from point 134 to point 136 in a series of integration steps each having a second amplitude. The second amplitude integration steps are of a lesser magnitude than the first amplitude integration steps. The segments 112 and 114 are incremented to have a positive slope.

The segment 116 extends from point 136 to point 138 with a negative slope. Each of the increment steps in segment 116 has said second amplitude but with negative polarity. The segment 118 extends from point 138 to point 140 with negative incremental steps at the first amplitude corresponding to the steps in segment 112.

Segment 120 extends from point 140 to point 142 and has the polarity and amplitude of incremental steps as for segment 118.

The segment 122 extends from point 142 to point 144 with negative incremental steps at said second amplitude for each step.

The segment 124 extends from point 144 to point 146 with the second amplitude of incremental steps taken positively.

The segment 126 extends from point 146 to point 148 with positive incremental steps having the said first incremental amplitude as used in segment 112.

Heretofore, DTMF tone signals have been produced through the use of a small number of discrete steps in which there is no amplitude change during each step.

Such a tone signal has been producing using 32 steps per cycle. However, a tone signal produced in such a manner suffers in having a high level of sampling distortion at relatively low frequencies. This level of distortion prevents the use of such a tone signal in many DTMF applications which have relatively strict distortion requirements regarding the frequency of the distortion. The tone signal generated by the circuit of the present invention has substantially less distortion at low frequencies than a 32 element step tone signal even though the tone signal of the present invention has only eight basic segments. Thus the circuit of the present invention can be used in a great many more DTMF applications than previous DTMF circuits which have produced tone signals with discrete steps.

The distortion components for previous systems are described mathematically as follows. With the number of piecewise constant steps defined as N, the fundamental frequency as $f_o$ and the sampled component distortion as $f_d$, the relationship is:

$$f_d = (N \pm 1)f_o$$

The amplitude ($f_d$) of the sampling component $f_d$ is:

$$f_d = 1/(nN \pm 1) \text{ where } n = 1, 2, \ldots$$

For a 32 step piecewise constant system:

$$f_d = (32 \pm 1)f_o, (64 \pm 1)f_o, \text{etc.}$$

$$|f_d| = 1/(32 \pm 1), 1/(64 \pm 1), \text{etc.}$$

If, for example, $f_o = 700$ HZ:
$$f_d = 21,700, 44,100, \text{etc.}$$

$$|f_d| = 1/31, 1/63, \text{etc.}$$

Thus, there is substantial distortion (app. $-30$db) with respect to the fundamental frequency at about 30 times the fundamental.

For the circuit of the present invention the distortion components occur at a frequency:

$$f_d = f_o(nN \pm 1) \text{ where } n = 1, 2, \ldots$$

The amplitudes of the distortion components are:

$$|f_d| = |(Nn \pm 1)f_o| = 1/(Nn \pm 1)^2 \text{ where } n = 1, 2, \ldots$$

The integration steps of the present invention introduce sampling component distortion $f_{sd}$. These are the small steps shown in FIG. 2 and the distortion is described by:

$$f_{sd} = [(xn) \pm 1]f_o$$

$$|f_{sd}| = 1/[(xn) \pm 1]$$

Where x is the number of steps in one period and $n = 1, 2, \ldots$

In a typical application of the system of the present invention, there are 8 piecewise linear ramps (N) which produce distortion $f_d$:

$$f_d = 7f_o, 9f_o, 15f_o, 17f_o, \text{etc.}$$

$$f_d = 1/7^2, 1/9^2, 1/15^2, 1/17^2, \text{etc.}$$

From the above it can be seen that the piecewise linear distortion components are inversely proportional to the square the frequency of the component, thus this distortion is of less amplitude than a pure piecewise linear signal.

For the sampling distortion, $f_{sd}$, in a typical system of the present invention having 100 steps per period, and a 1 KHZ fundamental frequency the parameters are:

$$f_{sd} = 99\text{KHZ}, 101\text{KHZ}, 199\text{KHZ}, \text{etc.}$$

$$|f_{sd}| = 1/99, 1/101, 1/199, \text{etc.}$$

Thus it can be seen that the sampling distortion $f_{sd}$ occurs at relatively high frequencies, much higher than the fundamental frequencies. These low amplitude, high frequency sampling components can easily be filtered with an on-chip circuit such as a continuous time filter.

The keyboard scan circuit 42 shown in FIG. 1 is a commonly used circuit in the industry and has previously been implemented in Mostek Integrated Pulse Dialer, Part No. MK5098.

Figure 3:
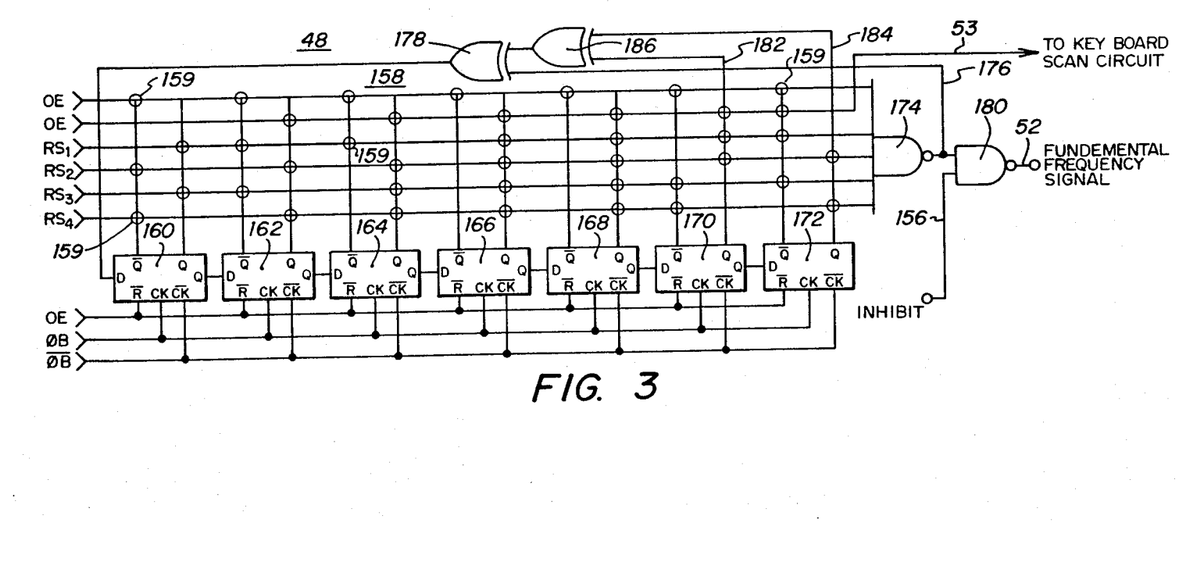
FIG. 3 is a schematic illustration of the row fundamental counter illustrated in FIG. 1.
Figure 4:
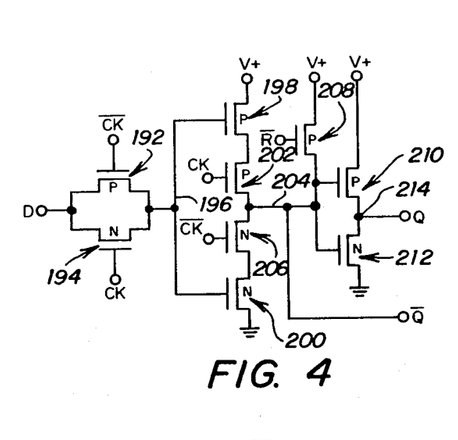
FIG. 4 is a schematic illustration of a logic circuit utilized in the circuit of FIG. 3.

The row fundamental counter 48 in circuit 10 is illustrated in detail in FIGS. 3 and 4. Referring to FIG. 3, the circuit 48 receives as inputs row selection signals $RS_1$-$RS_4$ which are the signals produced by the keyboard scan circuit 42. The circuit 48 further receives an oscillator enable (OE) signal and the $\phi B$ clock signal together with its complement. The circuit 48 produces one of a plurality of fundamental frequency signals in response to the selection of one of the row terminals $R_1$-$R_4$. The fundamental frequency signal produced at line 52 is inhibited by operation of an INHIBIT signal received at terminal 156.

The circuit 48 includes a connection matrix shown generally as 158 which connects each of the various inputs to a group of logic circuits 160-172. The circuits 160-172 are identical and a detailed schematic of the logic circuit is illustrated in FIG. 4. Each of the circles 159 represents a P channel transistor as shown in FIG. 3A.

The row lines of matrix 158 are connected to the input terminals of a NAND gate 174 which has the output thereof transmitted through a line 176 to an exclusive OR gate 178. The output of NAND gate 174 is further transmitted as one input to a NAND gate 180 which produces the pulse fundamental frequency signal at the output line 52 thereof.

The column lines 182 and 184 of matrix 158 are connected to the input terminals of an exclusive OR gate 186 which has the output thereof connected to a first input of exclusive OR gate 178. The second input of OR gate 178 is connected to line 176 which is the output of NAND gate 174. The output of gate 178 is connected to the D terminal of logic circuit 160. The Q output of each logic circuit 160-172 is connected to the D input of the next logic circuit on the immediate right hand side thereof. In response to the selection of one of the row terminals, the circuit 48 produces a pulse signal at one of the four rates which are shown in Table 1.

Figure 3A:
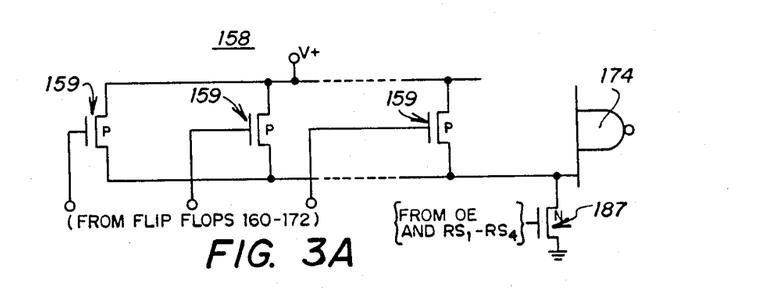
FIG. 3A is a schematic illustration of the matrix interconnections shown in FIG. 3.

Referring to FIG. 3A reference numeral 159 represents P channel transistors each of which has the drain terminal connected to V+, the source terminal connected to the drain terminal of an N channel transistor 187 and the gate terminal connected to one of the outputs of circuits 160-172. Transistor 187 has the source terminal connected to ground and the gate terminal connected to receive one of the inputs OE or $RS_1$-$RS_4$.

The schematic circuit for each of the logic circuits 160-172 is illustrated in FIG. 4. The D terminal is connected to P and N type transistors 192 and 194 which respectively have the gate terminals thereof connected to the $\overline{CK}$ and the CK terminals. Transistors 192 and 194 are further connected to a node 196 which is in turn connected to the gate terminals of a P type transistor 198 and an N type transistor 200. Transistor 198 has the drain terminal connected to V+ while transistor 200 is connected to ground.

A P type transistor 202 is connected between transistor 198 and a node 204 and an N type transistor 206 is connected between node 204 and transistor 200. The transistors 202 and 204 have the gate terminal thereof connected respectively to the CK and $\overline{CK}$ terminals.

The $\overline{Q}$ terminals of the logic circuits are connected to node 204 which is also connected to the source terminal of a transistor 208 which has the drain terminal thereof connected to V+ and the gate terminal connected to the $\overline{R}$ terminal. Node 204 is further connected to the gate terminals of transistors 210 and 212 which are P and N types respectively. Transistor 210 has the drain terminal thereof connected to V+ and the source terminal thereof connected to a node 214 which is connected to the Q terminal. The drain terminal of transistor 212 is connected to node 214 and the source terminal thereof is connected to ground.

TABLE 1

TONE OUTPUT

| | | STANDARD DTMF (Hz) | USING 3.579545 MHz CRYSTAL | INTEGRATION FREQUENCIES (Hz) |
|---|---|---|---|---|
| ROW | $f_1$ | 697 | 699.1 | 81,353 |
| | $f_2$ | 770 | 766.2 | 89,489 |
| | $f_3$ | 852 | 847.4 | 99,432 |
| | $f_4$ | 941 | 948.0 | 111,861 |
| COL-UMN | $f_5$ | 1209 | 1215.9 | 81,353 |
| | $f_6$ | 1336 | 1331.7 | 89,489 |
| | $f_7$ | 1477 | 1471.9 | 99,432 |
| | $f_8$ | 1633 | 1645.0 | 111,861 |

The column fundamental counter 76 shown in FIG. 1 is basically the same as the row fundamental counter 48 with the exception that it receives column rather than row signals and divides by different numbers to produce the desired outputs.

Figures 5, 6, 7:
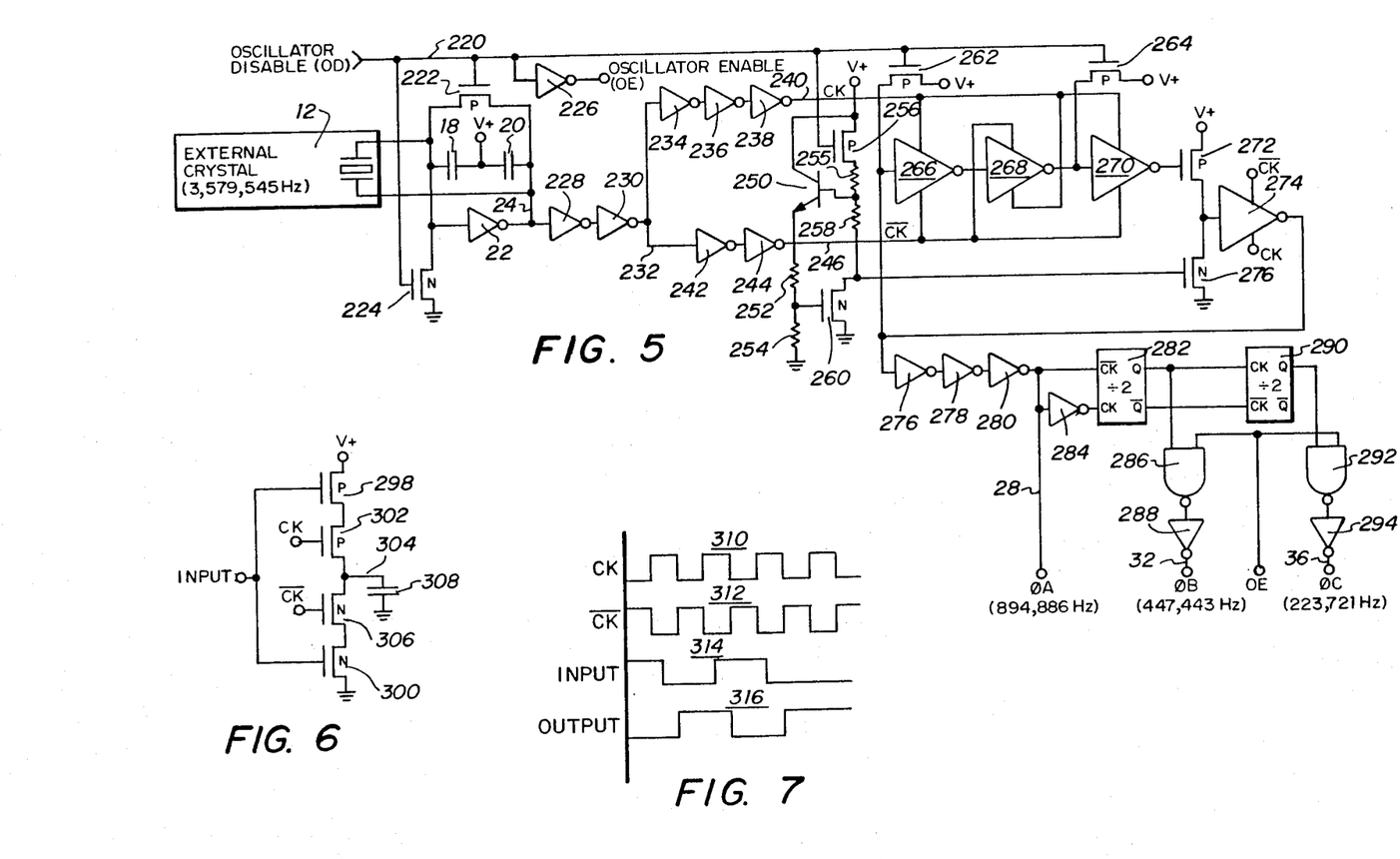
FIG. 5 is a schematic illustration of a clock generator circuit for producing selected clock signals.
FIG. 6 is a schematic illustration of a clocked inverter as used in the circuit shown in FIG. 5.
FIG. 7 is an illustration of the waveforms which occur in the clocked inverter shown in FIG. 6.

The clock signals $\phi_A$, $\phi_B$ and $\phi_C$ are generated by the circuits shown in FIG. 1 which are connected to receive the reference signal derived from the external crystal 12. The clock generator circuit which produces these clock signals is illustrated in FIG. 5. An oscillator disable (OD) signal is provided through a line 220 to the gate terminal of a P type transistor 222 and the gate terminal of an N type transistor 224. The OD signal is further provided to the input terminal of an inverter 226 which produces an oscillator enable (OE) signal.

The reference frequency signal is transmitted through node 24 and through inverters 228 and 230 to a node 232. The reference frequency signal is then transmitted through a series of three inverters 234, 236 and 238 to produce a CK signal at node 240. The reference signal is further transmitted from node 232 through a pair of inverters 242 and 244 to produce a $\overline{CK}$ signal at node 246.

The reference frequency signal is biased by operation of a circuit which includes a bipolar transistor 250 which has the collector terminal thereof connected to V+ and the emitter terminal thereof connected through series resistors 252 and 254 to ground. The base terminal of transistor 250 is connected through a resistor 255 to the source terminal of a P type transistor 256 which has the drain terminal thereof connected to V+ and the gate terminal thereof connected to line 220. The base terminal of transistor 250 is further connected through a resistor 258 to the drain terminal of an N type transistor 260 which has the source terminal thereof grounded and the gate terminal thereof connected to the junction of resistors 252 and 254.

The OD signal is further connected to the gate terminals of P type transistors 262 and 264 which have the drain terminals thereof connected to V+. The source terminal of transistor 262 is connected to the input of an inverter 266 which receives the CK and $\overline{CK}$ signals generated at nodes 240 and 246 respectively. The output of inverter 266 is connected to the input of an inverter 268 which likewise receives the CK and $\overline{CK}$ signals. The output of inverter 268 is connected to an inverter 270 which also receives the CK and $\overline{CK}$ signals.

The output of inverter 270 is connected to the gate terminal of a P type transistor 272 which has the drain terminal thereof connected to V+ and the source terminal thereof connected to a clocked inverter 274. The source terminal of transistor 272 is further connected to an N-type transistor 276 which has the source terminal thereof grounded and the gate terminal thereof connected to the drain terminal of transistor 260. The drain terminal of transistor 276 is connected to the drain terminal of transistor 272. Inverters 266-270 are clocked inverters and a detailed schematic of the clocked inverters is given in FIG. 6.

The output of clocked inverter 274 is connected to the input of clocked inverter 266.

The output of clocked inverter 274 is connected through inverters 276, 278 and 280 which has the output thereof connected to line 28. The $\phi A$ clock signal is generated at the output of inverter 280.

The $\phi A$ clock signal is further provided to the $\overline{CK}$ terminal of a flip-flop 282. The $\phi A$ is further transmitted through an inverter 284 to the CK terminal of flip-flop 282. The Q output of flip-flop 282 is connected as a first input to a NAND gate 286 which has the output thereof connected to an inverter 288. The output of inverter 288 is connected to line 32 which transmits the $\phi B$ signal.

The Q output of flip-flop 282 is further connected to the CK terminal of a flip-flop 290. The $\overline{Q}$ output of flip-flop 282 is connected to the $\overline{CK}$ terminal of flip-flop 290. The Q terminal of flip-flop 290 is connected to a first input of a NAND gate 292 which receives the OE signal as a second input. The OE signal is further provided as a second input to the NAND gate 236.

The output of NAND gate 292 is transmitted through an inverter 294 which produces the $\phi C$ signal at line 36.

The external crystal 12 is preferably a televison color burst crystal which operates at a frequency of 3.579545 Hz. When the reference frequency signal is at this frequency the clock signal $\phi A$ is at a frequency of 894,886 Hz, the clock signal $\phi B$ is at a frequency of 447,443 Hz and the clock signal $\phi C$ is at a frequency of 223,721 Hz.

A schematic illustration of the clocked inverters 266, 268, 270 and 274 is illustrated in FIG. 6. The input to the inverter is connected to the gate terminal of a P type transistor 298 and the gate terminal of an N type transistor 300. The transistor 298 is connected to V+ and the transistor 300 is connected to ground. The CK clock signal is provided to the gate terminal of a P type transistor 302 which is connected between transistor 298 and a node 304. The $\overline{CK}$ terminal is connected to the gate terminal of an N type transistor 306 which is connected between node 304 and transistor 300. A parasitic capacitor 308 is shown between node 304 and ground. Node 304 is the output of the clocked inverter. The clocked inverter illustrated in FIG. 6 successfully functions at the high frequency of the reference signal while being supplied with a power voltage as low as 2.5 volts.

The waveforms which appears in the clocked inverter illustrated in FIG. 6 are shown in FIG. 7. The CK signal is shown as waveform 310, the $\overline{CK}$ signal as waveform 312, a typical input as waveform 314 and the output resulting from input 314 is shown as waveform 316. The clocked inverter shown in FIG. 6 functions essentially as a conventional D-latch, but is capable of continuing to function at extremely low supply voltages.

Figure 8:
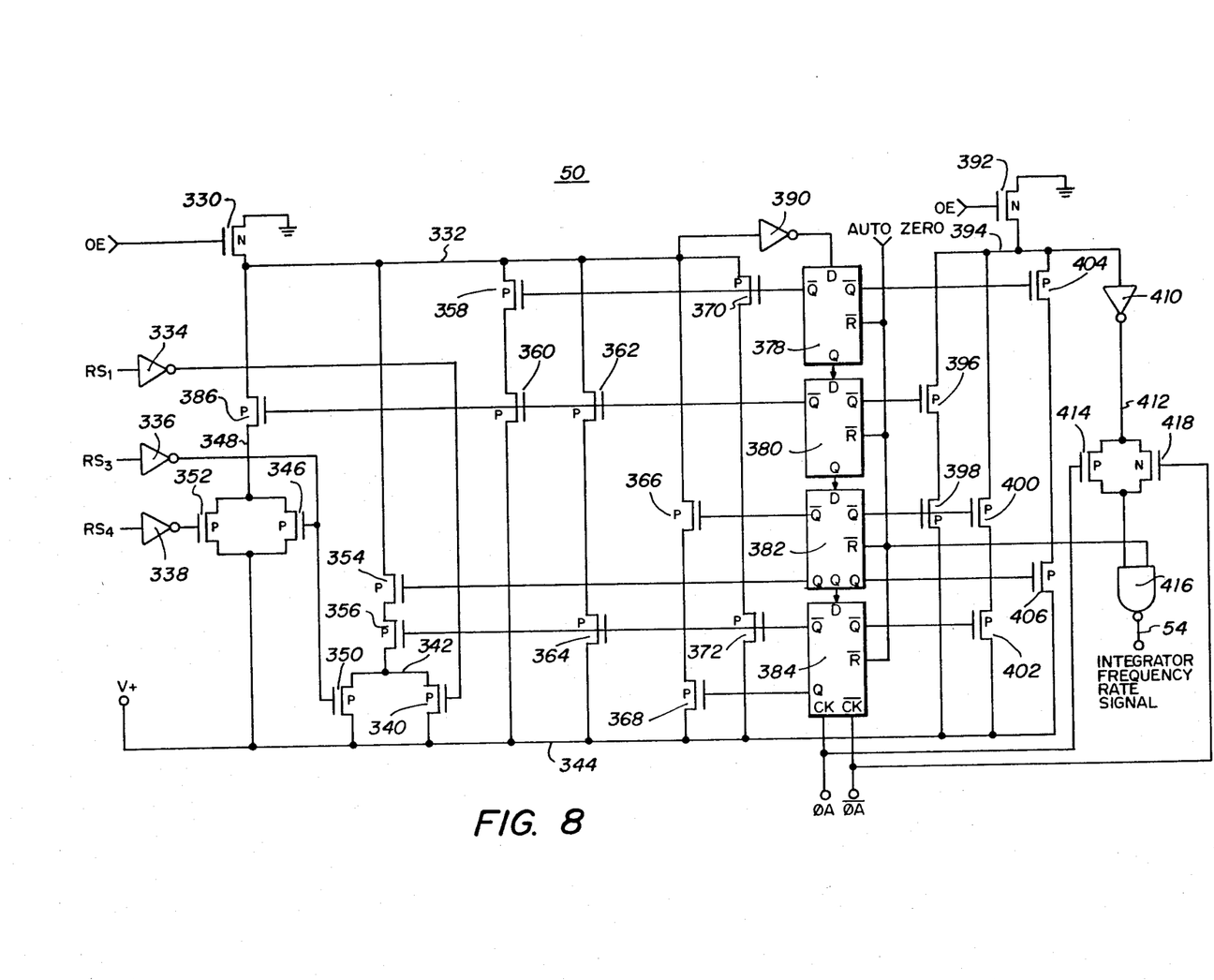
FIG. 8 is a schematic illustration of the row integrator counter illustrated in FIG. 1.

The row integrator counter 50 illustrated in FIG. 1 is shown in detailed schematic illustration in FIG. 8. The output enable signal (OE) is provided to the gate terminal of an N type transistor 330 which has the source terminal thereof connected to ground and the drain terminal thereof connected to a node 332. The row selection signal $RS_1$, $RS_3$ and $RS_4$ are supplied respectively to the inputs of inverters 334, 336 and 338.

The output of inverter 334 is connected to the gate terminal of a P type transistor 340 which has the drain terminal thereof connected to a node 342 and the source terminal thereof connected to V+ through node 344.

The output of inverter 336 is connected to the gate terminal of a P type transistor 346 which has the drain terminal thereof connected to a node 348 and a source terminal thereof connected through node 344 to V+. The output of inverter 336 is further connected to the gate terminal of a P type transistor 350 which has the drain terminal thereof connected to node 342 and the source terminal thereof connected to V+.

The output of inverter 338 is connected to the gate terminal of a P type transistor 352 which has the drain terminal thereof connected to node 348 and the source terminal thereof connected to V+.

A P type transistor 354 has the drain terminal thereof connected to node 332 and the source terminal thereof connected to the drain terminal of another P type transistor 356 which has its source terminal connected to node 342.

A P type transistor 358 has the drain terminal thereof connected to node 332 and a source terminal thereof connected to the drain terminal of a P type transistor 360 which has the source terminal thereof connected to node 344.

A P type transistor 362 has the drain terminal thereof connected to node 332 and the source terminal thereof connected to the drain terminal of a P type transistor 364 which has the source terminal thereof connected to node 344 to receive the voltage V+.

A P type transistor 366 has the drain terminal thereof connected to node 332 and the source terminal thereof connected to the drain terminal of a P type transistor 368 which has the source terminal thereof connected to V+.

A P type transistor 370 has the drain terminal thereof connected to node 332 and the source terminal thereof connected to the drain terminal of a P type transistor 372 which has the source terminal thereof connected to V+.

Figure 9:
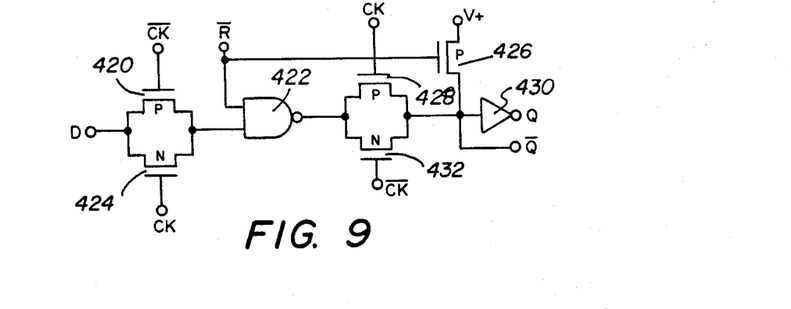
FIG. 9 is a schematic illustration of a logic circuit which is utilized in the circuit illustrated in FIG. 8.

The row integrator counter 50 includes a group of four logic circuits 378, 380, 382 and 384 which are structurally identical and the schematic thereof is illustrated in FIG. 9.

Still referring to FIG. 8 the gate terminals of transistors 358 and 370 are connected to the $\overline{Q}$ output of logic circuit 378. The gate terminals of transistors 360, 362 and a transistor 386 are connected to the $\overline{Q}$ output of logic circuit 380. The source and drain terminals of transistor 386 are connected between node 332 and node 348.

The gate terminal of transistor 366 is connected to the $\overline{Q}$ output of logic circuit 382. The gate terminal of transistor 354 is connected to the Q output of logic circuit 382.

The gate terminals of transistors 356, 364 and 372 are connected to the $\overline{Q}$ output of logic circuit 384 while the Q output of this circuit is connected to the gate terminal of transistor 368.

An inverter 390 has the input thereof connected to node 332 and the output thereof connected to the D input of logic circuits 378. The Q output of circuit 378 is connected to the D input of circuit 380 which has the Q output thereof connected to the D input of circuit 382. The Q output of circuit 382 is connected to the D input of circuit 384.

An auto zero signal is supplied to the $\overline{R}$ inputs of the logic circuits 378-384. Generation of the $\overline{R}$ signal is described below.

An N type transistor 392 has the gate terminal connected to receive the OE signal and the source and drain terminals thereof connected between ground and a node 394.

A P type transistor 396 has the drain terminal thereof connected to node 394, the source terminal thereof connected to the drain terminal of a P type transistor 398 which has the source terminal thereof connected to node 344. The gate terminal of transistor 396 is connected to the $\overline{Q}$ output of logic circuit 380 and the gate terminal of transistor 398 is connected to the $\overline{Q}$ output of logic circuit 382.

A P type transistor 400 has the drain terminal thereof connected to node 394 and the source terminal thereof connected to the drain terminal of a P type transistor 402 which has the source terminal thereof connected to node 344. The gate terminal of transistor 402 is connected to the $\overline{Q}$ output of a logic circuit 384.

A P type transistor 404 has the drain terminal thereof connected to node 394 and the source terminal thereof connected to the drain terminal of a P type transistor 406 which has the source terminal thereof connected to node 344 for receiving V+. The gate terminal of transistor 404 is connected to the $\overline{Q}$ output of logic circuit 378 while the gate terminal of transistor 406 is connected to the Q output of logic circuit 382.

The $\phi A$ and $\overline{\phi A}$ clock signals are provided respectively to the CK and $\overline{CK}$ terminals of the logic circuits 378-384.

An inverter 410 has the input terminal thereof connected to node 394 and the output terminal thereof connected to a node 412. A P type transistor 414 has the gate terminal thereof connected to receive the $\phi A$ clock signal, the drain terminal thereof connected to node 412 and the source terminal thereof connected as a first input to a NAND gate 416. An N type transistor 418 has the drain and source terminals thereof connected between node 412 and the first input to NAND gate 416 and the gate terminal thereof connected to receive the $\overline{\phi A}$ clock signal. The second inut to the NAND gate 416 is connected to receive the auto zero signal. The integrator frequency rate signal is generated at the output of NAND gate 416 and transmitted through line 54.

A schematic diagram of the logic gates 378–384 is shown in FIG. 9. A P type transistor 420 has the drain and source terminals thereof connected between the D terminal and a first input to a NAND gate 422. An N type transistor 424 has the drain and source terminals thereof connected between the D terminal and the first input to NAND gate 422. The $\overline{CK}$ terminal is connected to the gate of transistor 420 and the CK terminal is connected to the gate of transistor 424. The $\overline{R}$ terminal is connected to the second input of NAND gate 422 and to the gate terminal of a P type transistor 426. The drain terminal of transistor 426 is connected to V+ and the source terminal is connected to the $\overline{Q}$ terminal of the logic circuit. A P type transistor 428 has the drain and source terminals thereof connected between the output of NAND gate 422 and the input to an inverter 430. An N type transistor 432 has the drain and source terminals thereof connected between the output of NAND gate 422 and the input of the inverter 430. The gate terminal of transistor 428 is connected to the CK terminal and the gate of transistor 432 is connected to the $\overline{CK}$ terminal. The Q output is taken at the output of inverter 430 and the $\overline{Q}$ output is taken at the source terminal of transistor 426.

The column integrator counter 78 shown in FIG. 1 is essentially the same as the row integrator counter 50 described in FIGS. 8 and 9, but receives column inputs in place of the row inputs described for counter 50 and produces column integration frequency signals.

Figure 10:
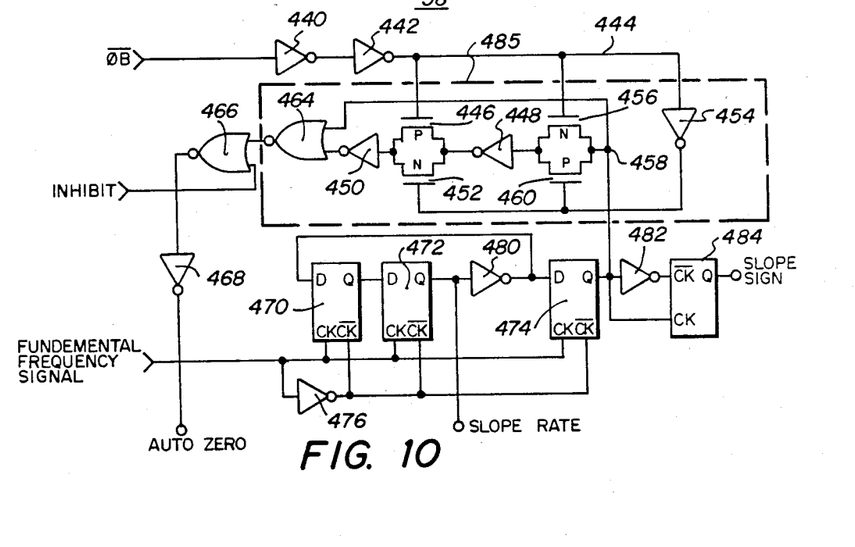
FIG. 10 is a schematic illustration of the row fundamental clock generator illustrated in FIG. 1.

The row fundamental clock generator 56 is shown as a detailed schematic illustration in FIG. 10. The $\phi B$ clock signal is transmitted through a series of inverters 440 and 442 to a node 444.

Node 444 is connected to the gate terminal of a P type transistor 446 which has the drain and source terminals thereof connected between the output of an inverter 448 and the input of an inverter 450. An N type transistor 452 has the drain and source terminals thereof connected in parallel with the drain and source terminals of transistor 446 and the gate terminal thereof connected to the output of an inverter 454 which has the input thereof connected to node 444.

An N type transistor 456 has the gate terminal thereof connected to node 444 and the drain and source terminals thereof connected between a node 458 and the input to inverter 448. A P type transistor 460 has the drain and source terminals thereof connected between node 458 and the input to inverter 448 and the gate terminal thereof connected to the output of inverter 454.

A NOR gate 464 has a first input thereof connected to the output of inverter 450 and the second input thereof connected to terminal 458.

A NOR gate 466 has a first input connected to the output of OR gate 464 and a second input connected to receive the INHIBIT signal. The output of NOR gate 466 is transmitted through an inverter 468 to generate the AUTO ZERO signal.

The fundamental frequency signal generated by the row fundamental counter 48 is provided to each of the CK inputs of D type flip-flops 470, 472 and 474. The fundamental frequency signal is further transmitted through an inverter 476 and the inverted signal thus produced is provided to the $\overline{CK}$ input of flip-flops 470, 472 and 474. The Q output of flip-flop 470 is connected to the D input of flip-flop 472 and the Q output of flip-flop 472 is connected to the input of an inverter 480. A slope rate signal is taken at the Q output of flip-flop 472. The output of inverter 480 is supplied to the D terminal of flip-flop 470 and to the D terminal of flip-flop 474.

The Q output of flip-flop 474 is connected to node 458 and to the input of an inverter 482 and to the CK terminal of a T-type flip-flop 484. Inverter 482 transmits the output thereof to the $\overline{CK}$ input of flip-flop 484. A SLOPE SIGN signal is taken at the Q output of flip-flop 484.

Figure 11:
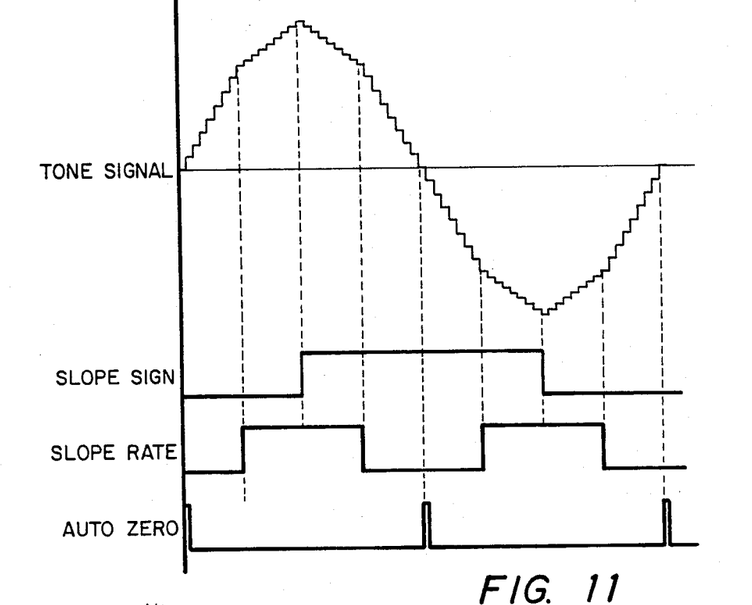
FIG. 11 is an illustration of various waveforms which are produced in the circuit shown in FIG. 10.

The row fundamental clock generator circuit 58 generates the specialized clock signals including SLOPE SIGN, SLOPE RATE and AUTO ZERO each of which is illustrated in FIG. 11 in relation to the tone signal produced by the row integrator 64. Column fundamental clock generator 82 shown in FIG. 1 is structurally similar to the row fundamental clock generator 58 described above.

In reference to FIG. 10, flip-flops 470 and 472 together with inverter 480 perform a divide-by-four function to produce the SLOPE RATE signal from the fundamental frequency signal. Flip-flop 474 delays the SLOPE RATE signal by one period of the fundamental frequency signal and the delayed signal is transmitted through inverter 482 and flip-flop 484 to generate the SLOPE SIGN signal. The delayed signal from flip-flop 474 is also used to drive a one-shot circuit indicated within dotted line 485. The output of the one-shot circuit, from NOR gate 464 is transmitted through NOR gate 466 and inverter 468 to produce the AUTO ZERO signal which has the period of the $\phi B$ clock.

Figure 12:
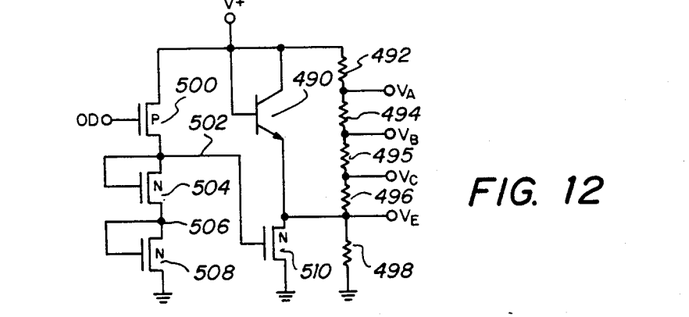
FIG. 12 is a schematic illustration of a reference voltage generation circuit for producing the reference voltages used in the circuit of the present invention.

The circuit of the present invention is designed to operate at extremely low supply voltages, as low as 2.5 volts. The circuit requires a number of reference voltages in its operation and such voltages are produced by the circuit illustrated in FIG. 12. The reference voltages are set to be taken very close to V+ so that when V+ drops to a low level, there remains sufficient turn on voltage for P channel devices. Referring now to FIG. 12, V+ is supplied to the base terminal of an NPN transistor 490 which also has the collector terminals connected to V+. The emitter terminal of transistor 490 is connected to a $V_E$ reference terminal. Since both the base and collector terminals of transistor 490 are connected to V+ the transistor 490 functions essentially as a diode and provides a one diode pn drop of approximately 0.6 volts between V+ and $V_c$. A series of resistors 492, 494, 495 and 496 are connected between V+ and reference terminal $V_E$. A reference terminal $V_A$ is taken at the junction of resistor 492 and 494, a reference terminal $V_B$ is taken at the junction of resistors 494 and 495 and a reference terminal $V_C$ is taken at the junction of resistors 495 and 496. A resistor 498 is connected between terminal $V_E$ and ground.

Since the transistor 490 provides approximately a 0.6 volt drop between V+ and $V_E$, the voltage differentials between $V_A$, $V_B$ and $V_C$ will be equal since resistors 494 and 495 have essentially the same impedance. For example when V+ is 2.5 volts, $V_A$ will be 2.1 volts, $V_B$ will be 2.0 volts and $V_C$ will be 1.9 volts.

The OD (oscillator disable) signal is provided to the gate terminal of a P type transistor 500 which has the drain terminal thereof connected to V+ and the source terminal thereof connected to a node 502. An N type transistor 504 has the drain and source terminals thereof connected between node 502 and a node 506. The gate terminal of transistor 504 is connected to node 502. An N type transistor 508 has the drain and source terminals thereof connected between node 506 and ground and the gate terminal thereof is connected to node 506. A further N type transistor 510 has the gate terminal thereof connected to node 502 and the drain and source terminal thereof connected between the emitter of transistor 490 and ground.

Figure 13:
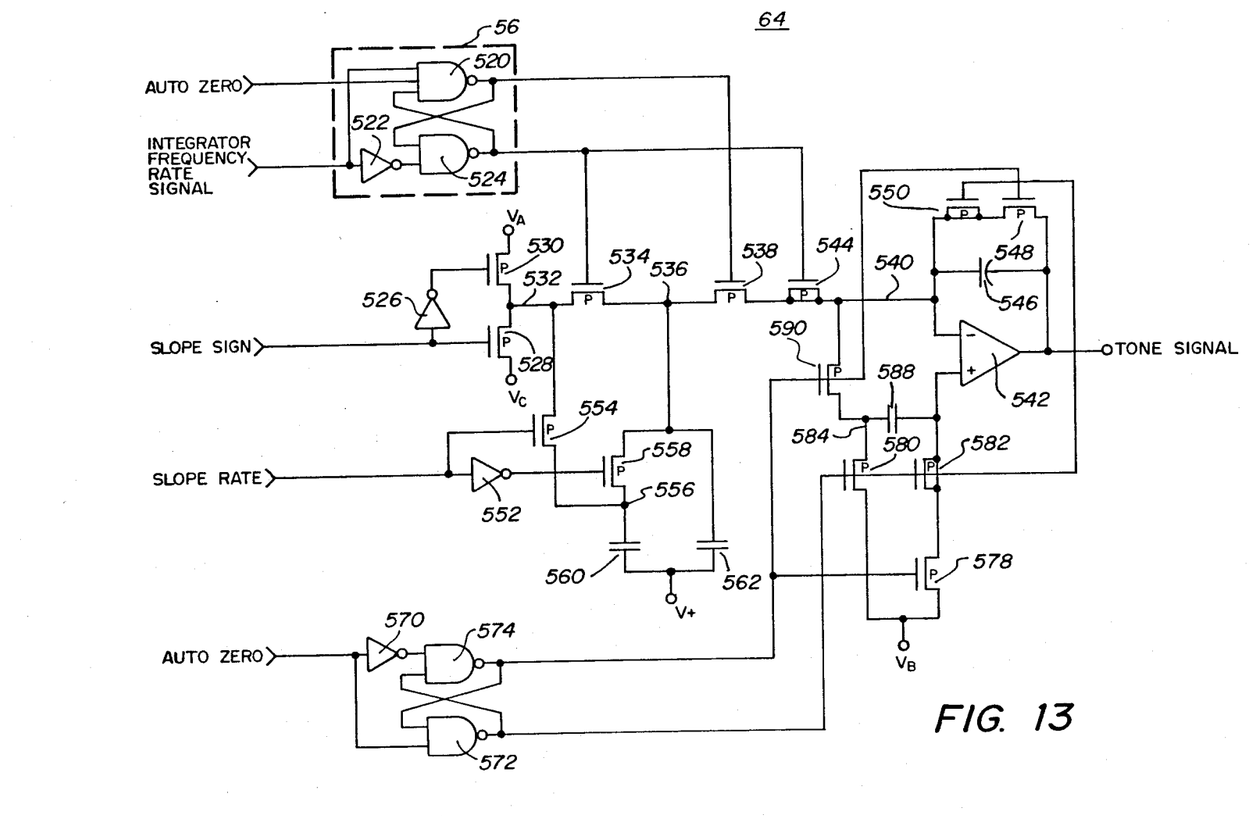
FIG. 13 is a schematic illustration of the row integrator which is shown in FIG. 1.

The row integrator 64 shown in FIG. 1 is illustrated in a detailed schematic diagram in FIG. 13. Integrator 64 receives the specialized clock signals produced by the row fundamental clock generator together with a group of clock signals from the row integrator clock generator 56 which is also illustrated in FIG. 13. The integrator 64 produces the synthesized sinusoidal tone signal which is shown in FIG. 2 and in FIG. 11.

Referring now to FIG. 13, the row integrator clock generator 56 receives as inputs the AUTO ZERO signal and the INTEGRATOR FREQUENCY RATE signal. The AUTO ZERO signal is provided as a first input to a NAND gate 520 and the INTEGRATOR FREQUENCY RATE signal is provided as a second input to the NAND gate 520. An inverter 522 receives the INTEGRATOR FREQUENCY RATE signal and supplies the inverted signal thereof as a first input to a NAND gate 524. The NAND gate 520 and 524 are cross coupled such that the output of NAND gate 520 supplies the second input to NAND gate 524 and the output of NAND gate 524 supplies the third input to NAND gate 520. The outputs of NAND gates 520 and 524 are thus inverse signals.

The SLOPE SIGN signal is provided as the input to an inverter 526 and to the gate terminal of a P type transistor 528. The output of inverter 526 is provided to the gate terminal of a P type transistor 530 which has the drain terminal thereof connected to reference voltage $V_A$ and the source terminal thereof connected to a node 532. The P type transistor 528 has the drain terminal thereof connected to node 532 and the source terminal thereof connected to reference voltage $V_C$.

The output of NAND gate 524 is provided to the gate terminal of a P type transistor 534 which has the drain and source terminals thereof connected between node 532 and a node 536. The output of NAND gate 520 is connected to a P type transistor 538 which has the drain and source terminals thereof connected between node 536 and a node 540 which is connected to the inverting input of an operational amplifier 542.

The output of NAND gate 524 is further provided to the gate terminal of a P type transistor 544 which has the drain and source terminals thereof connected to node 540 such that transistor 544 functions as a capacitor.

A feedback capacitor 546 is connected between the output terminal of operational amplifier 542 and the inverting input terminal. A P type transistor 548 has the drain and source terminals thereof connected between the inverting input of operational amplifier 542 and the output terminal thereof. A P type transistor 550 has the drain and source terminals thereof connected to the input of operational amplifier 542 such that transistor 550 functions as a capacitor. The synthesized tone signal is produced at the output of a operational amplifier 542.

The SLOPE RATE signal produced by the row fundamental clock generator 58 is provided to the input of an inverter 552 and to the gate terminal of a P type transistor 554 which has the drain and source terminals thereof connected between node 532 and a node 556. The output of inverter 552 is connected to the gate terminal of a P type transistor 558 which has the drain terminal thereof connected to node 536 and the source terminal thereof connected to node 556.

A capacitor 560 has the terminals thereof connected between node 556 and V+ and a corresponding capacitor 562 has the terminals thereof connected between node 536 and V+. Capacitors 560 and 562 determine the amplitude of the incremental integration steps.

The AUTO ZERO signal is provided to the input terminals of an inverter 570 and a first input to NAND gate 572. The output of inverter 570 is connected to a first input terminal of a NAND gate 574 which is cross coupled with NAND gate 572. The output of NAND gate 574 is connected to the second input of NAND gate 572 and the output of NAND gate 572 is connected to the second input of NAND gate 574. Thus the output signals from the NAND gates 572 and 574 are inverse of each other.

The output of NAND gate 574 is connected to the gate terminals of P type transistors 548, 578, and 590. The drain and source terminals of transistor 578 are connected between the noninverting input of operational amplifier 542 and the reference voltage $V_B$. The drain and source terminals of transistor 580 are connected between a node 584 and a reference voltage $V_B$. The drain and source terminals of transistor 590 are connected between node 540 and node 584.

A capacitor 588 has a first terminal thereof connected to the noninverting input of operational amplifier 542 and the second terminal thereof connected to node 584.

The output of NAND gate 572 is connected to the gate terminals of transistors 580, 582 and 550. The drain and source terminals of transistor 580 are connected between node 584 and reference voltage $V_B$. The drain and source terminals of transistor 582 are connected together to the noninverting input of operational amplifier 542.

The row integrator 64 functions essentially as a switched capacitor integrator wherein charge is stored on either capacitor 562 or the combination of capacitors 560 and 562 and provided operational amplifier 542. The incremental addition of charge to capacitor 546 serves to step the voltage at the output of operational amplifier 542. The rate and polarity of the incremental steps are changed in response to the SLOPE SIGN and SLOPE RATE signals to produce the synthesized tone signal shown in FIG. 2.

The column integrator 92 is structurally the same as the row integrator 64 and produces a corresponding column tone signal which corresponds to the selected one of the columns.

Figure 14:
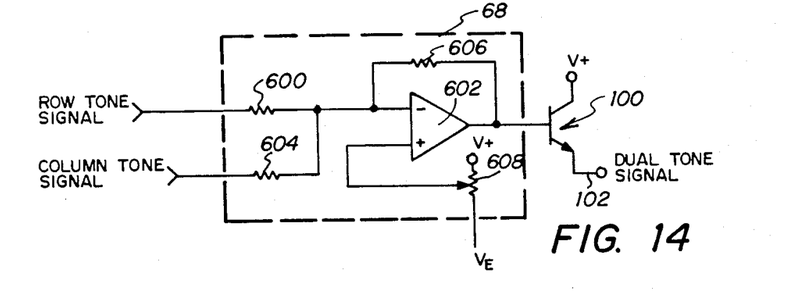
FIG. 14 is a schematic illustration of the summer shown in FIG. 1.

The summing circuit 68 illustrated in FIG. 1 is shown in a detailed schematic diagram in FIG. 14. The row tone signal is transmitted through a resistor 600 to the inverting input of an operational amplifier 602. The column tone signal is transmitted through a resistor 604 also to the inverting input of operational amplifier 602. A feedback resistor 606 is connected between the output of operational amplifier 602 and the inverting input thereof. The noninverting input of operational amplifier 602 is connected to the center terminal of a programmable bias adjust node 608 which is fabricated to meet the requirements of individual customers. The resistive terminals of node 608 are connected between V+ and the reference voltage $V_E$. The output signal from operational amplifier 602 is a summation of the row and column tone signals produced by the respective row and column integrators. This constitutes the dual tone signal which is produced in response to the depression of a selected key on a keyboard which supplies the inputs to the row and column keyboard scan circuit 42 and 44.

The dual tone signal produced by operational amplifier 602 is transmitted to the base terminal of transistor 100 which has the source terminal thereof connected to the output terminal 102 of circuit 10.

The row and column signals are summed at the noninverting input terminal of operational amplifier 602 and a DC bias for the dual tone signal is selected by the programmable bias adjustment node 608.

The operation of the circuit 10 has been described in general in reference to FIG. 1. Specific functional blocks with FIG. 1 will now be described in greater operational detail.

The circuit of the present invention produces dual tone signals in accordance with the standards of the telephone industry. The standard DTMF tone frequencies are listed in Table 1. The single tones produced with the circuit of the present invention are listed in Table 1 where the reference oscillator produces a signal at a frequency of 3.579543 MHZ. The four row frequencies, $f_1$–$f_4$, are produced by the row fundamental counter 48 and the four column frequencies, $f_5$–$f_8$, are produced by the column fundamental counter 76. For each of the row and column fundamental frequencies of the present invention there is produced a corresponding integration frequency which is also listed in Table 1. The row integration frequencies are produced by the row integrator counter 50 and the column integration frequencies are produced by the column integrator counter 78.

The row fundamental counter 48 shown in FIG. 3 functions as a countdown circuit which receives the $\phi$B signal and from this reference signal produces fundamental frequencies which are used to generate the row tone signals are listed in Table 1. The column fundamental counter 76 functions in the same manner to produce column fundamental signals which are used to generate the column tone signals shown in Table 1. In the selected embodiment of the present invention the fundamental frequency signals are at a rate eight times that of the tone signal produced therefrom.

The integration frequency rate signal for the row lines is produced by the row integrator counter 50 which is shown in FIG. 8. This circuit receives the $\phi$A reference signal together with input signals which define the selected row. From these inputs the circuit 50 produces the four row integration frequencies listed in Table 1. The column integrator counter 78 functions in a similar manner and receives the column input signals to produce the four column integration frequency rate signals shown in Table 1. The integration rate signals need not be exact multiple frequencies of the tone signals produced therefrom.

The specialized clock signals used by the row integrator 64 are produced by the row fundamental clock generator 58 which is shown in FIG. 10. The specialized clock signals are shown in FIG. 11.

The column fundamental clock generator 82 functions in a similar manner to produce specialized clock signals for the column integrator 92.

The row integrator 64 produces the four synthesized tone signals at the rates listed in Table 1. Circuit 64 functions essentially as a switched capacitor integrator. Referring to FIGS. 11 and 13 the small amplitude incremental steps are produced when capacitor 562 is charged and capacitor 560 is isolated from capacitor 562. Capacitor 560 is disconnected by operation of the SLOPE RATE signal which serves to render conductive or nonconductive transistor 558. The SLOPE RATE signal drives transistor 558 conductive to place capacitor 560 in parallel with capacitor 562 so as to provide greater charge increments into capacitor 546.

The transistors 534 and 538 are switched on and off alternately at the integration rate frequency to charge the capacitors 560 and 562 and then to connect the charge stored thereon to the operational amplifier 542. When the transistor 538 is rendered conductive the inverting input of the operational amplifier receives a signal which causes capacitor 546 to be further charged and thus provided another step in the integration process. The operational amplifier 542 rapidly balances the charges on the input and output terminals to form the steps in the integration process.

The slope of the integration process is determined by the SLOPE SIGN signal which is connected to alternately drive transistors 528 and 530 which are respectively connected to the $V_A$ and $V_C$ reference voltages. The output of the operational amplifier 542 is generated relative to the $V_B$ reference signal. When the transistor 530 is rendered conductive the capacitors 560 and 562 receive the $V_A$ reference signal which provides negative integration increments. But when transistor 528 is rendered conductive, the capacitors 560 and 562 or just capacitor 562 receive the reference signal $V_C$ which drives the output at positive incremental steps.

At the end of each cycle, it is desired to reset the tone signal to a zero reference to prevent the operational amplifier 542 from drifting. This is accomplished by the transistor 548 being driven conductive in response to the AUTO ZERO signal. When transistor 548 is turned on, the capacitor 546 is shorted and the output of the operational amplifier 542 is driven in a zero reference.

The transistor 550 serves to provide charge cancellation to node 540.

The offset voltage of operational amplifier 542 is accommodated by the charging of capacitor 588. During the AUTO ZERO active state, the output terminal and inverting input terminal of the operational amplifier 542 are shorter and the capacitor 588 is connected directly across the input terminals of the operational amplifier when transistor 590 is rendered conductive by the auto zero signal. Under this circuit configuration the capacitor 588 is charged to the offset voltage of operational amplifier 542. After the AUTO ZERO active state has been completed the capacitor 588 is connected in series with the reference voltage $V_B$ to provide the appropriate offset bias for the operational amplifier thereby eliminating offset bias from the output of amplifier 542.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

I claim:

1. A circuit to compensate for the offset voltage of an operational amplifier, comprising:
   means for connecting the output terminal of said amplifier to a first of the input terminals;
   a capacitor having a first terminal thereof connected to the second input terminal of said amplifier;

means for connecting the second terminal of said capacitor to said first input terminal when said output terminal and said first terminal are connected; and means for connecting said second terminal of said capacitor to a reference node when said output terminal is not connected to said first terminal, said capacitor charged to provide at said second input terminal an offset compensating voltage for said amplifier.

2. The circuit recited to claim 1 further including means for connecting the first terminal of said capacitor to said reference node when said output terminal is connected to said first input terminal.

3. The circuit recited in claim 1 wherein said first input terminal is an inverting input of said amplifier and said second input terinal is a noninverting input of said amplifier.

4. A method to compensate an operational amplifier for the offset voltage thereof, comprising the steps of:

selectively connecting the output terminal of the amplifier to a first of the input terminals;

connecting the first terminal of a capacitor to the second input terminal of said amplifier;

connecting the second terminal of said capacitor to said first input terminal when said output terminal and said first terminal of said amplifier are connected; and connecting said second terminal of said capacitor to a reference node when said output terminal is not connected to said first terminal wherein said capacitor is charged to provide an offset compensating voltage for the amplifier at said second input terminal.

* * * * *